United States Patent
Wang et al.

(10) Patent No.: US 10,622,894 B2
(45) Date of Patent: Apr. 14, 2020

(54) SYNCHRONOUS CONVERTER

(71) Applicant: SIGNIFY HOLDING B.V., Eindhoven (NL)

(72) Inventors: Binghong Wang, Eindhoven (NL); Reinhold Elferich, Aachen (DE)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/472,950

(22) PCT Filed: Dec. 5, 2017

(86) PCT No.: PCT/EP2017/081510
§ 371 (c)(1),
(2) Date: Jun. 24, 2019

(87) PCT Pub. No.: WO2018/114322
PCT Pub. Date: Jun. 28, 2018

(65) Prior Publication Data
US 2019/0372461 A1    Dec. 5, 2019

(30) Foreign Application Priority Data
Dec. 22, 2016    (EP) .................................... 16206154

(51) Int. Cl.
*H02M 3/158*    (2006.01)
*H02M 1/08*    (2006.01)
(Continued)

(52) U.S. Cl.
CPC ........... *H02M 3/158* (2013.01); *H02M 1/083* (2013.01); *H05B 45/37* (2020.01); *H02M 2001/0058* (2013.01)

(58) Field of Classification Search
CPC ................. H02M 3/158; H02M 1/083; H02M 2001/0058; H05B 33/0815
(Continued)

(56) References Cited

U.S. PATENT DOCUMENTS 6,151,233 A    11/2000 Kondo
2002/0014861 A1*  2/2002 Hui ...................... H05B 41/282
                                                  315/224
(Continued)

FOREIGN PATENT DOCUMENTS

EP    2677647 A2    12/2013
WO    2014060872 A1    4/2014

OTHER PUBLICATIONS

Marian K. Kazimierczuk, "Pulse-Width Modulated DC-DC Power Converters," Chapter 13, "Current-Mode Control," John Wiley & Sons, Ltd., Sep. 2008 (60 pages).

*Primary Examiner* — Don P Le
(74) *Attorney, Agent, or Firm* — Stephen M. Kohen

(57) ABSTRACT

A synchronous converter for driving a load (4) comprises a first switch (M1) coupled in series with a second switch (M2) via a node (x), an inductor (L1) coupled to the node (x), input terminals (10, 11) for receiving an input voltage (Vin) from a power source, output terminals (12, 13) for supplying an output current and an output voltage to the load (4), a first mode wherein the first switch (M1) is in an on state and the second switch (M2) is in an off state, and wherein the first switch and the inductor (L1) form a series arrangement coupled between the input terminals (10, 11), a second mode wherein the first switch (M1) is in the off state and the second switch (M2) is in the on state, and wherein the second switch (M2) and the inductor (L1) form a series arrangement coupled between the output terminals (12, 13). The synchronous converter further comprises a control circuit (1) comprising a threshold control circuit (2) for generating a threshold control signal (iq2) for switching off one switch of the first switch (M1) and the second switch (M2) when a current threshold of a current through this one switch is exceeded, wherein the threshold control circuit has an input for receiving a current signal indicating a current (Continued)

through this one switch and a comparator for comparing the current signal with the current threshold to obtain the threshold control signal and an on-time control circuit (3) comprising a calculating unit for directly calculating an on-time duration for the other switch of the first switch (M1) and the second switch (M2), wherein the on-time duration is proportional to an average output current (ILED) and inversely proportional to an output voltage (Vout) and for adjusting a negative peak current (Ineg) to obtain a substantially constant switching frequency of the synchronous converter when the synchronous converter is in normal operating mode.

15 Claims, 7 Drawing Sheets

(51) Int. Cl.
*H05B 33/08* (2020.01)
*H02M 1/00* (2006.01)
*H05B 45/37* (2020.01)

(58) Field of Classification Search
USPC .......................................................... 315/291
See application file for complete search history.

(56) References Cited

U.S. PATENT DOCUMENTS

| | | | |
|---|---|---|---|
| 2009/0295300 A1* | 12/2009 | King | H05B 33/0815 315/209 R |
| 2011/0121754 A1* | 5/2011 | Shteynberg | H05B 33/0815 315/294 |
| 2014/0070780 A1 | 3/2014 | Yanagida | |
| 2014/0159667 A1 | 6/2014 | Kim et al. | |
| 2014/0312868 A1 | 10/2014 | Dally | |
| 2015/0303817 A1 | 10/2015 | Rutgers et al. | |
| 2016/0036312 A1 | 2/2016 | Shenoy | |
| 2019/0252969 A1* | 8/2019 | Li | H02M 1/32 |

* cited by examiner

SYNCHRONOUS CONVERTER

CROSS-REFERENCE TO PRIOR APPLICATIONS

This application is the U.S. National Phase application under 35 U.S.C. § 371 of International Application No. PCT/EP2017/081510, filed on Dec. 5, 2017, which claims the benefit of European Patent Application No. 16206154.3, filed on Dec. 22, 2016. These applications are hereby incorporated by reference herein.

FIELD OF THE INVENTION

The invention relates to a synchronous converter for providing power to a load. The present invention also relates to a method of providing power to a load.

BACKGROUND OF THE INVENTION

Light-emitting diodes (LEDs) are used as a kind of solid-state light source. Compared with conventional lighting, such as incandescent or fluorescent lamps, its advantages are compactness, high efficacy, good color, various and variable color, etc. LEDs are widely used in indoor lighting, decoration lighting and outdoor lighting. Some of these applications require the output light of the LEDs to be adjusted from 1% to 100% of the maximum light output.

In the field of drivers, drivers are known in many different topologies. Some of these topologies e.g. buck converter, boost converter, buck-boost converter can be configured in a synchronous topology. This particularly results in a high efficient driver.

In the field of LED drivers, synchronous converters are well known for driving LED loads. US 2016/0036312 discloses a synchronous buck converter comprising a first switch, a second switch and an inductor. At the beginning of a cycle, the first switch is turned on, and current rises in the inductor. At the end of the rise, the first switch is turned off and the second switch is turned on consecutively and the current decays in the inductor. The second switch can be turned off at the time the current returns to zero. The first switch is then turned on again when a preset value associated with the resonant interval across the switching node exceeds a predefined value.

US 2014/0070780 discloses a control circuit for controlling a switching transistor and a synchronous rectifying transistor of a switching regulator and includes: a bottom detection comparator configured to assert an on signal; a timer circuit configured to generate an off signal; a zero current detector configured to assert a zero current detection signal; and a driving circuit configured to receive the on signal, the off signal and the zero current detection signal, and (i) turn on the switching transistor and turn off the synchronous rectifying transistor when the on signal is asserted, (ii) turn off the switching transistor and turn on the synchronous rectifying transistor when the off signal is asserted, and (iii) turn off the switching transistor and the synchronous rectifying transistor when the zero current detection signal is asserted.

U.S. Pat. No. 6,151,233 discloses a switching power circuit wherein adopting the synchronous rectifying system, when a first switch is cut-off, current IL of an inducing element is maintained by a commutating diode, and the inducing element releases an energy which was stored in a conduction period of the first switch. A second switch connected in parallel to the commutating diode is conducted so as not to be overlapped with the conduction period of the first switch. In the conduction period of the second switch, the current IL does not flow through the commutating diode, and it is possible to prevent lowering of efficiency caused by forward voltage drop. An inducing element current detecting circuit monitors the current IL and, when the current IL is reversing its direction, instructs a control circuit to cut-off the second switch. As a result, no reverse current flows through the inducing element even when the load is small, thus realizing a switching power circuit always having high efficiency.

SUMMARY OF THE INVENTION

It is an objective of the invention to provide a synchronous converter and a corresponding converting method for controlling a buck, boost, or buck-boost synchronous converter, with an improved efficiency. According to a first aspect of the present invention, a synchronous converter for driving a load is provided, comprising:

a first switch coupled in series with a second switch via a node;

an inductor, coupled to the node;

input terminals for receiving an input power from a power source;

output terminals for supplying an output current and an output voltage to the load;

wherein the synchronous converter is arranged to be operated in a first mode and a second mode, wherein in the first mode the first switch is in an on state and the second switch is in an off state, and the first switch and the inductor form a series arrangement coupled between the input terminals; and wherein in the second mode the first switch is in the off state and the second switch is in the on state, and the second switch and the inductor form a series arrangement coupled between the output terminals;

and wherein the synchronous converter further comprises a control circuit, the control circuit comprising:

a threshold control circuit for generating a threshold control signal for switching off one switch of the first switch and the second switch when a current threshold of a current through this one switch is exceeded, wherein the threshold control circuit has an input for receiving a current signal indicating a current through this switch, and a comparator for comparing the current signal with the current threshold; and an on-time control circuit comprising a calculating unit for directly calculating an on-time duration for the other switch of the first switch and the second switch, wherein the on-time duration is proportional to an average output current and inversely proportional to an output voltage and wherein a desired negative peak current (Ineg) is chosen such that a switching frequency of the synchronous converter remains substantially constant.

This synchronous power converter has an improved efficiency by using an on-time control circuit for determining an on-time duration for the other switch of the first switch and the second switch. Using an on-time controller allows for a more accurate switching moment of the other switch resulting in a reduced peak current. With a lower peak current, the total peak-to-peak current can also be lowered to achieve the same average output current with an increased efficiency. A specific negative current peak amplitude may be required to allow the synchronous converter to operate in a zero volt switching mode. If the negative current peak amplitude is too low, zero voltage switching is not possible. If the negative current peak amplitude is too large, additional losses are produced.

In one embodiment, the switching moment of the first switch is controlled by the threshold control circuit, which turns off the first switch upon reaching a threshold control signal and turns on the second switch consecutively. The switching off instant of the second switch is controlled by the on-time control circuit by turning off the second switch after a predetermined or calculated on-time of the second switch. The first switch is switched on at or after the switching off instant. With the on-time control, the negative current peak through the second switch is reduced and therefore, the positive current peak through the first switch can also be reduced for achieving the desired average output current.

Alternatively, the switching moment of the first switch is controlled by the on-time control circuit, where the on-time control circuit turns off the first switch after the on-time of the first switch and turns on the second switch consecutively. The switching moment of the second switch is controlled by the threshold control circuit which turns off the second switch upon reaching a threshold control signal and turns on the first switch consecutively. In this manner, the positive current peak through the first switch is reduced and therefore, the negative current peak through the second switch can also be reduced for achieving the desired average output current.

In another embodiment, the synchronous converter comprises a resistor or a transformer to obtain a current signal through the other switch.

In another embodiment, the on-time controller controls the second switch and the synchronous converter increases the on-time of the second switch when the desired output current should be lower. This allows the synchronous converter to control the current trough the load. If the load comprises a LED, a dimming of the LED is obtained by lowering the average output current. During dimming of the load, an increase of the negative current peak amplitude allows a lower average output current without a drastic change in the switching frequency of the first and second switches because both the positive peak current and the negative peak current can be adjusted for reducing the average output current. The risk of audible noise has been reduced since a smaller frequency band can now be used for operating the synchronous converter.

In another embodiment, when in normal operation state, the synchronous converter is arranged to be operated in only the first mode and the second mode.

In another embodiment, the synchronous converter is arranged to operate in zero voltage switching mode. This even further improves the efficiency of the synchronous converter.

In another embodiment a system comprises the synchronous converter according to the invention and a load. The load may be an LED load. The LED load may comprise a single LED or any number of LEDs arranged in any series or parallel arrangement or any combination thereof.

The synchronous converter may operate in continuous mode, discontinuous mode or critical conduction mode.

According to another embodiment of the present invention, a method for driving a load is provided, comprising the steps for controlling a buck, boost, or buck-boost synchronous power converter comprising subsequently:

turning on a first switch for storing energy in an inductor;
turning off the first switch upon reaching a threshold of energy stored in the inductor;
turning on a second switch;
calculating an on-time period of time for the second switch being proportional to the output current and inversely proportional to the output voltage, and
turning off the second switch at the on-time period of time.

With the help of the synchronous converter and the method according to the embodiments of the invention, the LED load can be driven more effectively.

These embodiments are alternative ways to implement a switch controlled by an on-time control circuit. These alternatives may comprise a buck converter, a boost converter or a buck-boost converter.

BRIEF DESCRIPTION OF THE DRAWINGS

Examples of the invention will now be described in detail with reference to the accompanying drawings, in which.

DETAILED DESCRIPTION OF THE EMBODIMENTS

Switched mode power supplies come in many configurations. The most common configurations are the buck converter and the boost converter. These converters can be controlled in a synchronous fashion. This means that the converter diode used in the buck or boost converter is replaced by a switch to reduce the conduction losses in the converter. Several configurations of a synchronous buck or boost converter will be described in more detail below.

Figure 1:
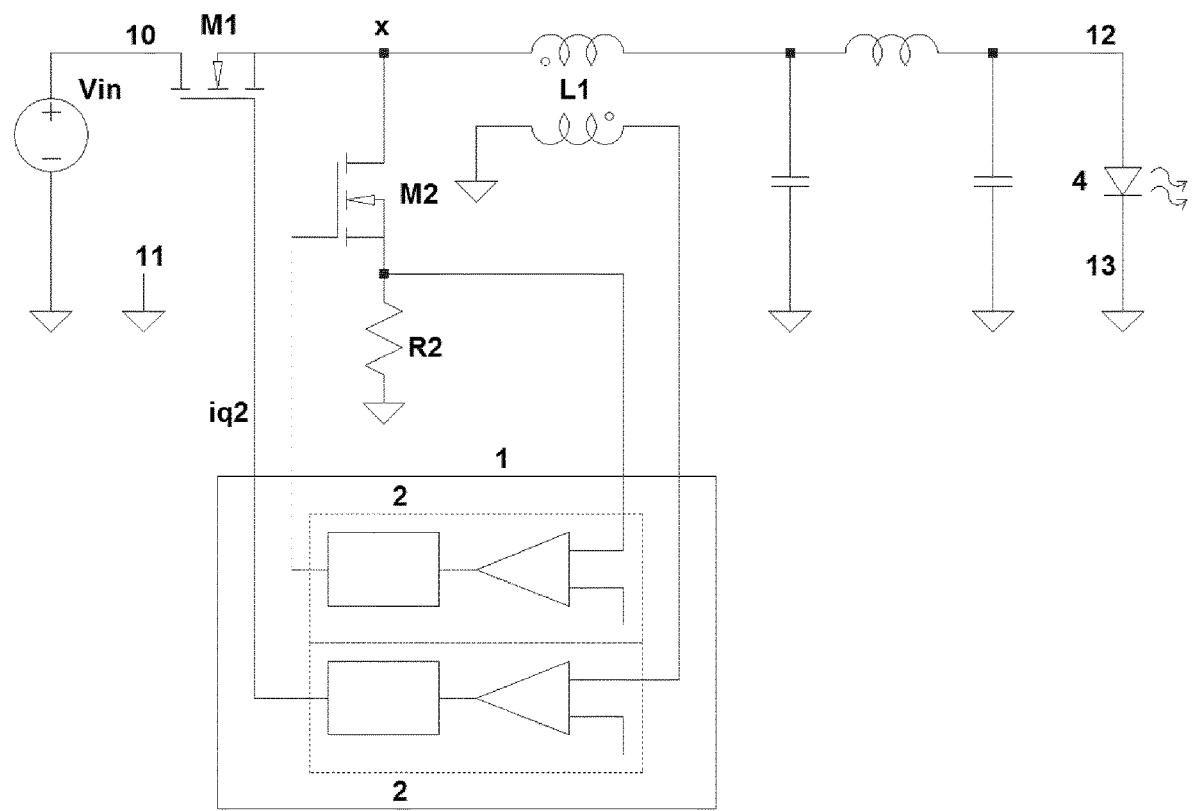
FIG. 1 shows a known synchronous buck converter for driving an LED load.

FIG. 1 shows a known synchronous buck converter. The converter comprises input terminals 10, 11 to receive an input voltage from a power source and output terminals 12, 13 for supplying an average output current ILED and an output voltage VOUT to the load 4. The converter further comprises a first switch M1 of which the main current path is connected in series through a node x with the main current path of a second switch M2. The not yet connected terminal of the main current path of the first switch M1 is further connected to one of the input terminals 10. The not yet connected terminal of the main current path of the second switch M2 is further connected to ground via a sense resistor R2. An inductor L1 is connected at one side to the node x and the other side to a pi-filter (C-L-C filter). The inductor L1 in this example is a transformer of which the primary side acts as an inductive energy storage and the secondary side acts as a sensing winding to sense the amount of current flowing through the primary side. The output of the pi-filter is connected to one of the output terminals 12. The not yet connected output terminal 13 is connected to ground. A control circuit is connected to the control gates of the first and second switches M1, M2. The controller receives signals coming from the sense resistor R2 and the secondary winding of the transformer.

This converter is controlled by the control circuit using threshold control for the first switch M1 and the second switch M2. Initially, the first switch M1 is turned on allowing a current through the inductor L1 to increase. The first switch M1 is turned off when the current through the inductor L1 exceeds a first predetermined threshold value. After a predetermined dead-time the second switch M2 is turned on and the current through the inductor starts to decrease. When the inductor current reaches a second predetermined threshold, the second switch M2 is turned off. After a predetermined dead-time, the cycle will start over.

Figure 2:
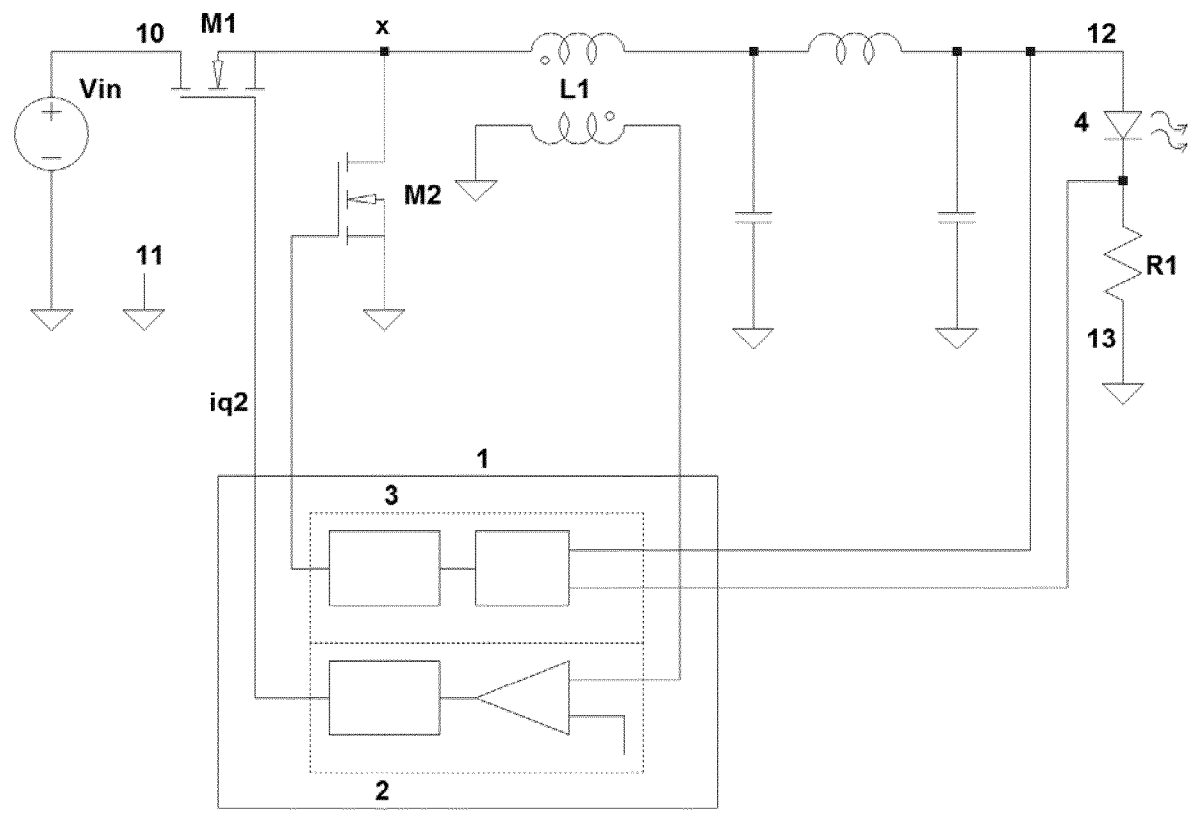
FIG. 2 shows a first detailed example of a synchronous buck converter in an embodiment according to the present invention.

FIG. 2 shows a first example of the synchronous converter for driving a load 4, in an embodiment according to the invention. The synchronous converter can be a synchronous buck converter. The synchronous buck converter comprises input terminals 10, 11 to receive an input voltage from a power source and output terminals 12, 13 for supplying an average output current ILED and an output voltage VOUT to the load 4. The converter further comprises a first switch M1 connected in series through a node x with a second switch M2. The first switch M1 is further connected to an input terminal 10. The second switch M2 is further connected to ground. The converter further comprises an inductor L1 having one end connected to the node x and the other end connected to a pi-filter (C-L-C filter). The inductor L1 in this example is a transformer where the primary side acts as an inductive energy storage and the secondary side acts as a sensing winding to sense the amount of current flowing through the primary side. The output of the pi-filter is connected to one of the output terminals 12. Another output terminal 13 is connected to ground. A control circuit 1 is used to control the first switch M1 and the second switch M2.

In an example, the control of the switches M1, M2 may be performed via a specific control algorithm provided by the control circuit 1. Initially, the first switch M1 is turned on. This allows a current to increase through the inductor L1. When the current exceeds a predefined threshold, the first switch M1 is turned off and after a predefined dead-time, the second switch M2 is turned on. The current in the inductor L1 starts to drop. After a predetermined on-time Ton, the second switch M2 is turned off and after a predetermined dead-time, the cycle will restart.

The switches M1 and M2 are generally implemented as a semiconductor bipolar transistor or a MOSFET.

The controller 1 determines the predefined threshold level for the first switch M1 to turn off and the on-time Ton for the second switch M2 to remain on. For determining the turn off moment of the first switch M1, the current through the first switch is sensed and converted to a control signal. This control signal is compared to a predefined reference value. When the sensed current exceeds the predefined reference value, the first switch M1 is turned off.

The controller may be an analog circuit that may comprise a comparator which compares the sensed current with the predefined reference value. The controller may also be a digital controller such as a field-programmable gate array (FPGA) microprocessor or a microcontroller.

The sensed current may be sensed by using a resistor in the path where the current is required to be measured. The voltage drop over the resistor determines a current through the resistor. The current may also be used by using a transformer in the path where the desired measured current flows. This transformer transforms a primary side sensed current to a secondary side signal representing the current flowing through the primary side. The converter inductor L1 may be used as the primary winding of this transformer.

The on-time of the second switch M2 can be selected based on experimental determination. The on-time can be determined for a predetermined L1, Iled and Vout, for example such that at a desired negative peak current is not too large causing addition losses but also not too small resulting in no zero voltage switching.

The on-time of the second switch M2, determined by the controller is preferably determined using the following equation:

$$Ton = \frac{L1 \cdot 2 \cdot (Iled + Ineg)}{Vout} - Tdelay$$

In this equation, Ton is the determined on-time of the second switch M2, L1 is the inductance value of the inductor L1, Iled is the average output current, Ineg is the desired negative peak current through the inductor L1 when zero voltage switching is desired, Vout is the output voltage and Tdelay is the delay caused by the switch off delay of the second switch M2. In this equation, the parameter Tdelay is an optimization of the determination of the on-time of the second switch M2. The on-time of the second switch M2 is already improved by using the equations:

$$Iled = \frac{Ipos - Ineg}{2}$$

Wherein Iled is the desired average output current determined by taking the average of Ipos, being the desired inductor peak current, and Ineg, being the absolute desired negative inductor peak current.

$$\Delta I = Ineg + Ipos$$

Wherein $\Delta I$ is the peak to peak inductor current.

$$Ton = \frac{L1 \cdot \Delta I}{Vout}$$

These equations are used to derive the final equation:

$$Ton = \frac{L1 \cdot 2 \cdot (Iled + Ineg)}{Vout}$$

Figure 3:
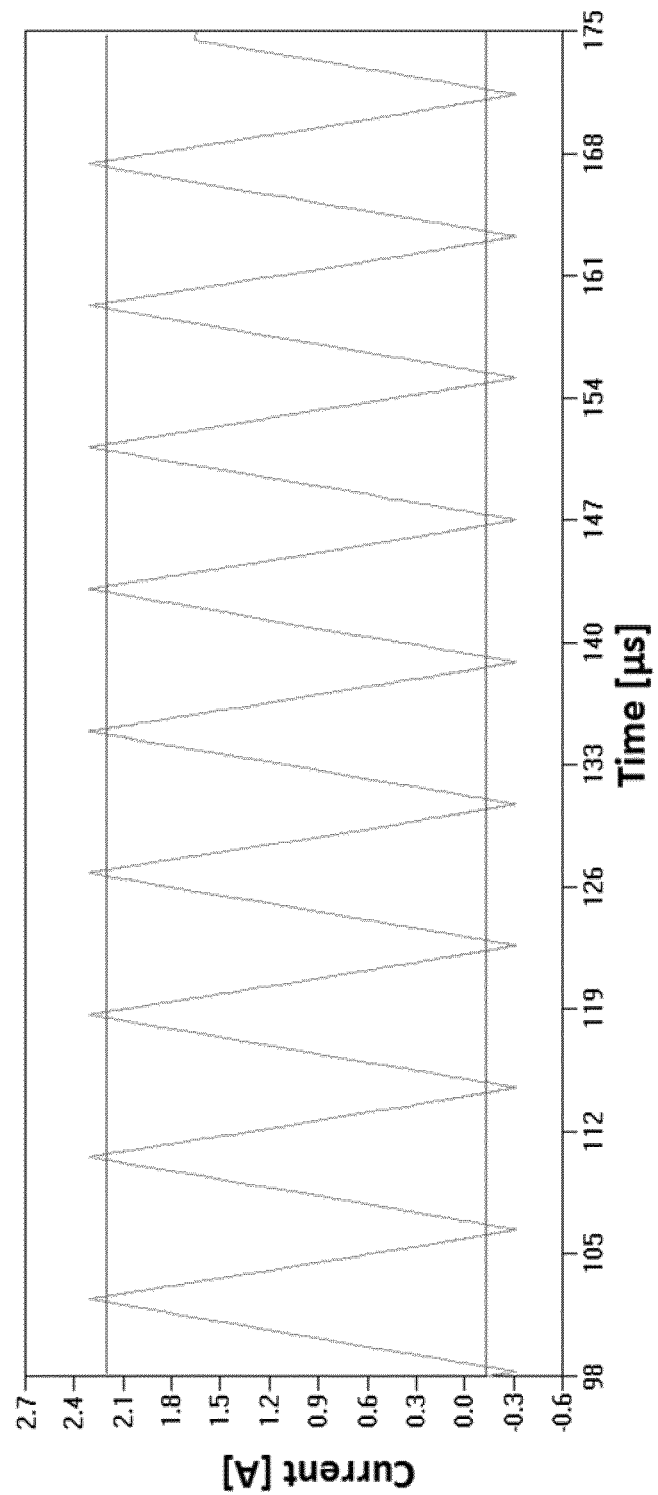
FIG. 3 shows a waveform of the inductor current in an embodiment according to the present invention.

FIG. 3 shows an example of a current waveform flowing through the inductor L1 that might have been created by a circuit as shown in FIG. 2. The positive peak may be the current peak amplitude determined by the reference threshold provided by the control circuit 1. The negative current peak amplitude may be determined by the determined on-time of the second switch M2.

It is possible to invert the determination of the positive and negative current peaks. The positive peak may be the current peak amplitude determined by the on-time of the first switch M1. The negative current peak may be determined by the determined reference threshold provided by the control circuit 1.

Figure 4:
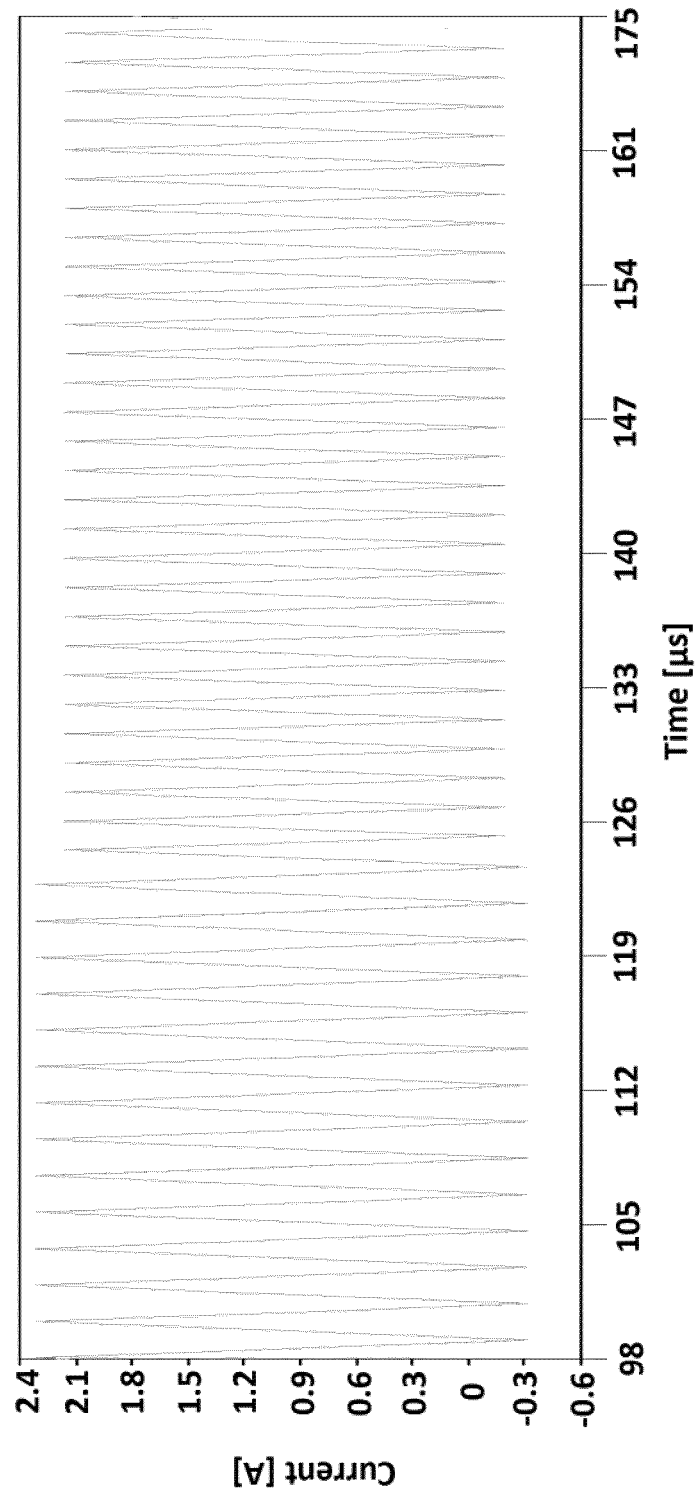
FIG. 4 shows a waveform of the inductor current in an embodiment according to the present invention when the output current is reduced.

FIG. 4 shows another example of a current waveform flowing through the inductor L1. As can be observed in the figure, the amplitude may vary for both the positive current and the negative current. This can be useful when the converter has to be capable to drive loads in a certain output voltage range. Varying the current amplitude is also beneficial when dimming of the load is required.

In an embodiment, the controller 1 receives a dimming signal.

If the dimming signal results in a dimming level above 30% and the output voltage exceeds a predefined output voltage threshold level, the negative current peak amplitude is set to a minimum amplitude and the positive current peak amplitude is also reduced.

If the dimming signal results in a dimming level above 30% and the output voltage does not exceed a predefined output voltage threshold level, the negative current peak amplitude is increased to guarantee zero voltage switching, and the positive current peak amplitude will be reduced for dimming.

If the dimming signal results in a dimming level below 30% and the output voltage exceeds a predefined output voltage threshold level, the negative current peak amplitude is increased for dimming the load and the positive current peak amplitude is reduced.

If the dimming signal results in a dimming level below 30% and the output voltage does not exceed a predefined output voltage threshold level, the negative current peak amplitude is increased for dimming and to enable zero voltage switching of the switches and the positive current peak amplitude is reduced for dimming.

Dependent on the application, the value of the dimming level need not be limited at 30% but may be selected to have a value suitable for this particular application.

Figure 5A:
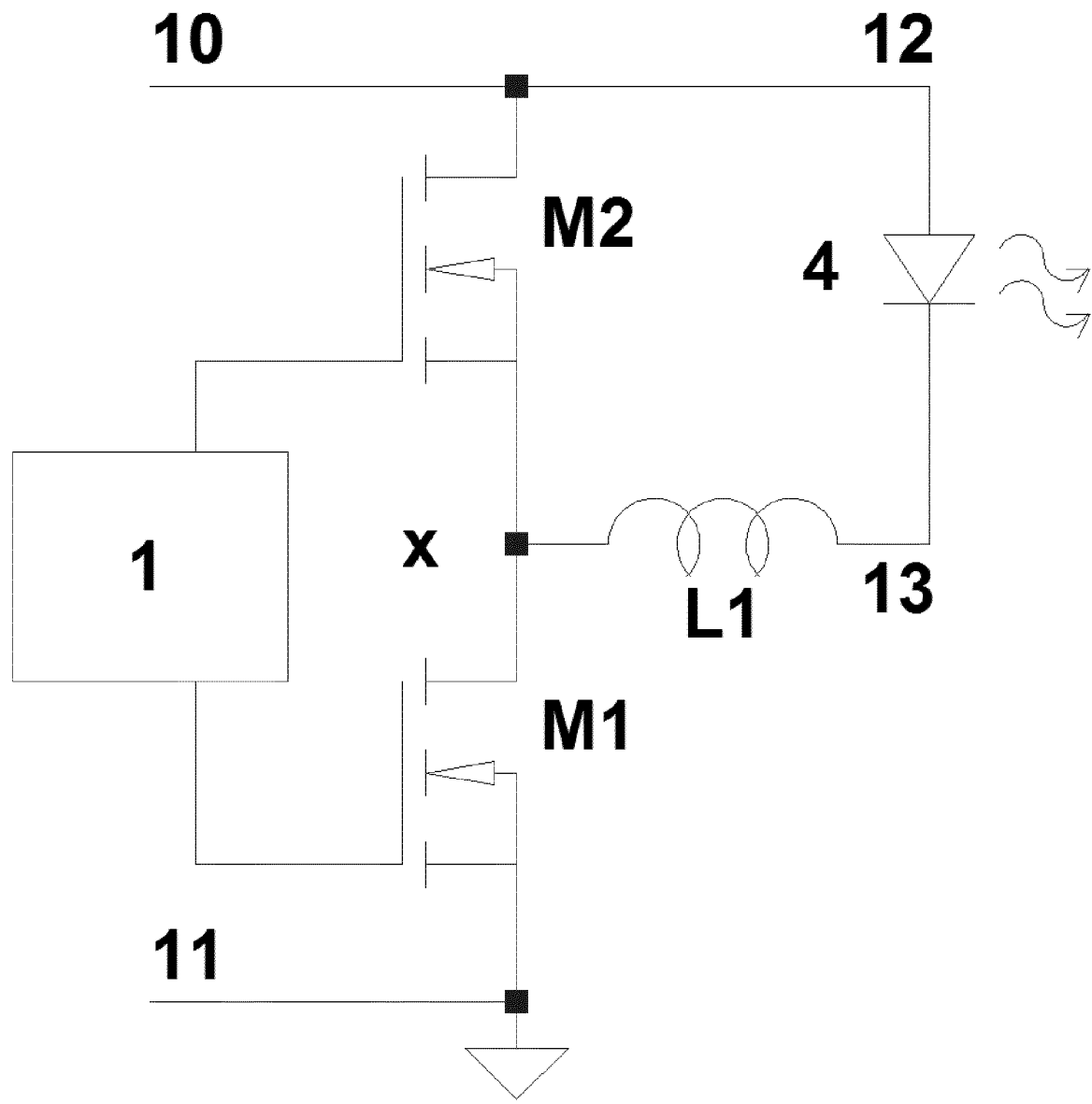
FIG. 5 shows two synchronous buck converters in an embodiment according to the present invention.

FIG. 5a shows an example of a synchronous buck converter according to the invention. The converter can operate using the same control algorithm according to the invention. The synchronous buck converter comprises input terminals 10, 11 for receiving an input voltage from a power source and output terminal 12, 13 for supplying an output current ILED and an output voltage VOUT to the load LED. The converter further comprises a first switch M1 and a second switch M2 connected is series with the first switch M1 through a node x. The first switch M1 is further connected to ground and the second switch M2 is further connected to an input terminal 10 and an output terminal 12. The converter further comprises an inductor L1 having one end connected to the node x and the other end connected to one of the output terminals 12.

Figure 5B:
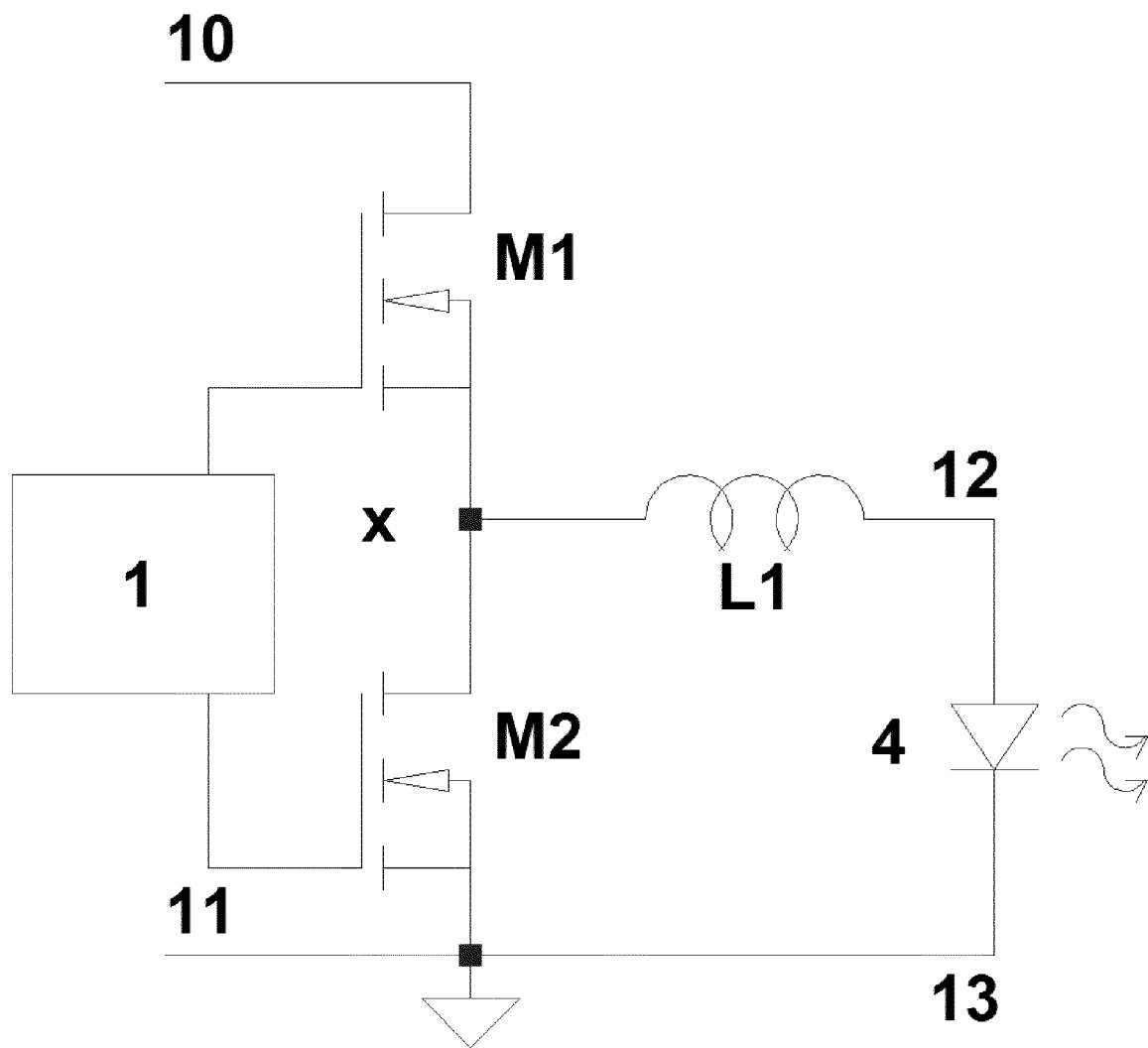

FIG. 5b shows another example of a synchronous buck converter according to the invention. The converter can operate using the same control algorithm according to the invention. The synchronous buck converter comprises input terminals 10, 11 for receiving an input voltage from a power source and output terminal 12, 13 for supplying an average output current ILED and an output voltage VOUT to the load 4. The converter further comprises a first switch M1 and a second switch M2 connected is series with the first switch M1 through a node x. The first switch M1 is further connected to an input terminal 10 and the second switch M2 is further connected to ground. The converter further comprises an inductor L1 having one end connected to the node x and the other end connected to one of the output terminals 12. Another input terminal 11 is interconnected to an output terminal 13 and connected to ground level.

Figure 6:
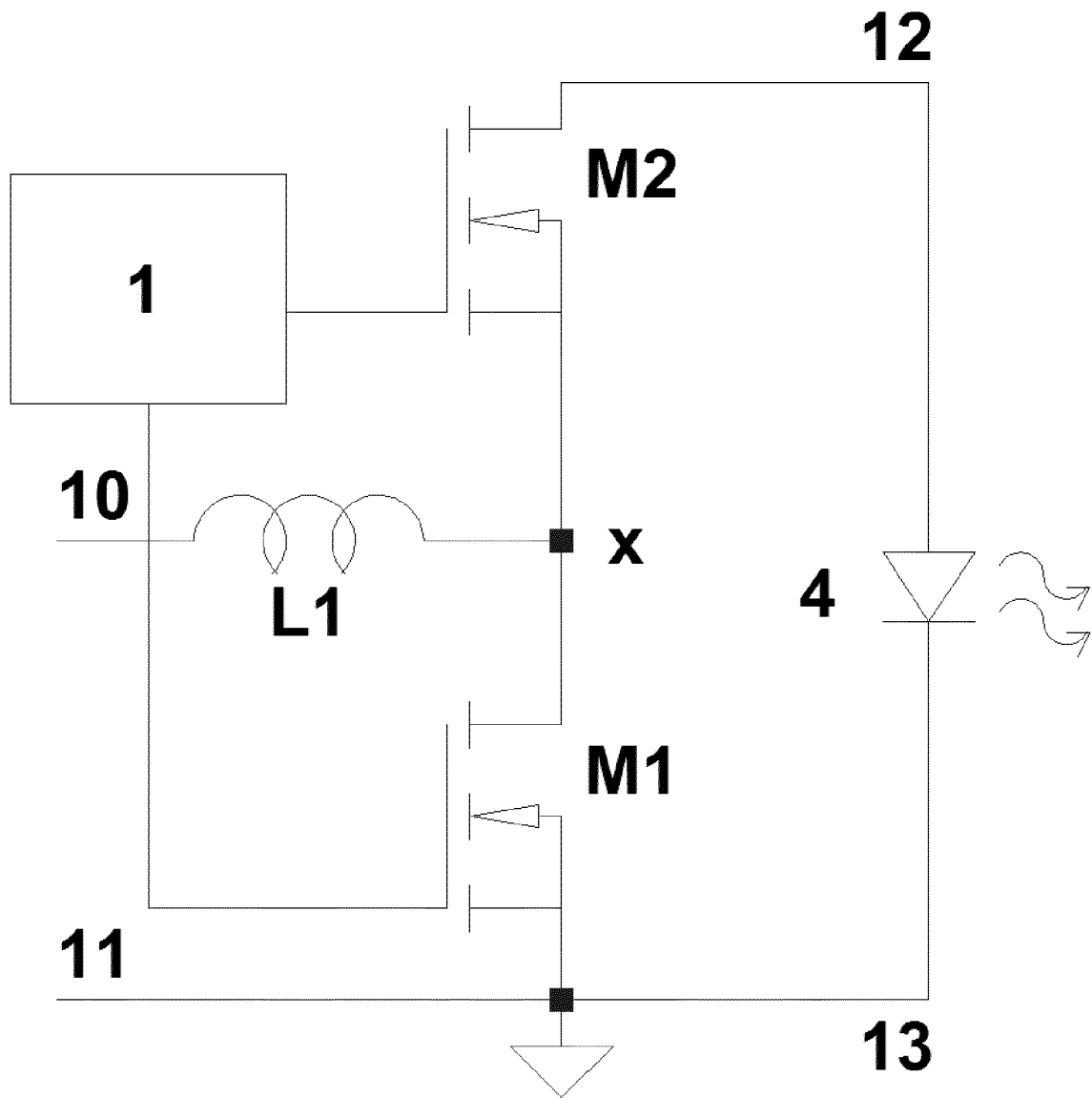
FIG. 6 shows a synchronous boost converter in an embodiment according to the present invention.

FIG. 6 shows an example of a synchronous boost converter using a control algorithm according to the invention.

The synchronous boost converter comprises input terminals 10, 11 for receiving an input voltage from a power source and output terminal 12, 13 for supplying an average output current ILED and an output voltage VOUT to the load 4. The converter further comprises a first switch M1 and a second switch M2 connected is series with the first switch M1 through a node x. The first switch M1 is further connected to ground 11 and the second switch M2 is further connected to an output terminal 12. The converter further comprises an inductor L1 having one end connected to the node x and the other end connected to one of the input terminals 10. Another input terminal 11 is interconnected to an output terminal 13 and connected to ground level.

In an example, the control of the switches may be performed via a specific control algorithm provided by the control circuit 1. Initially, the first switch M1 is turned on. This allows a current to build up in the inductor L1. When the current exceeds a predefined threshold, the first switch M1 is turned off and after a predefined dead-time, the second switch M2 is turned on. The current in the inductor L1 starts to drop. After a predetermined on-time, the second switch M2 is turned off and after a predetermined dead-time, the cycle will restart.

The on-time of the second switch M2 can be chosen based on experimental determination.

The on-time of the second switch M2, determined by the controller is preferably determined using the following equation.

$$Ton = \frac{L1 \cdot 2 \cdot (Iled + Ineg)}{Vout - Vin} - Tdelay$$

In this equation, Ton is the determined on-time of the second switch M2, L1 is the inductance value of the inductor L1, Iled is the average output current, Ineg is the desired negative peak current, when zero voltage switching is desired, through the inductor L1, Vout is the output voltage, Vin is the input voltage and Tdelay is the delay caused by at least the switch off delay of the second switch M2 but may deviate by the applied implementation.

In this equation, the parameter Tdelay is an optimization the determination of the on-time of the second switch M2. The on-time of the second switch M2 is already improved by having the equation:

$$Ton = \frac{L1 \cdot 2 \cdot (Iled + Ineg)}{Vout - Vin}$$

Under direct calculation of the on-time duration is to be understood that the calculation is performed before the start of the second mode, such that the time period is calculated for the on-time duration during the second mode. The calculated time period starts at the end of the first mode immediately preceding the second mode.

The synchronous converter can be arranged to be operated in normal operation in only the first mode and the second mode.

In order to obtain zero voltage switching for the synchronous converter operating in the buck mode, the desired negative peak current can be calculated according to the following equation:

$$I_{neg} = \frac{V_{in}}{Z_x} \cdot \sqrt{1 - 2\frac{V_{out}}{V_{in}}}$$

In this equation, Ineg is the desired negative peak current through the inductor (L1), Vin is the input voltage, Vout is the output voltage and Zx is calculated by:

$$Z_x = \sqrt{\frac{L1}{C_{hb}}}$$

In this equation, Chb is an equivalent half bridge capacitance. This capacitance is composed of multiple capacitors among which can be the output capacitances of the first and second switch and parasitic layout capacitances.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A synchronous converter for driving a load, the synchronous converter comprising:
   a first switch coupled in series with a second switch via a node;
   an inductor coupled to the node;
   input terminals for receiving an input voltage from a power source;
   output terminals for supplying an output current and an output voltage to the load;
   wherein the synchronous converter is arranged to be operated in a first mode and a second mode,
   wherein in the first mode the first switch is in an on state and the second switch is in an off state, and the first switch and the inductor form a series arrangement coupled between the input terminals; and
   wherein in the second mode the first switch is in an off state and the second switch is in an on state, and the second switch and the inductor form a series arrangement coupled between the output terminals; and
   wherein the synchronous converter further comprises a control circuit, the control circuit comprising:
   a threshold control circuit for generating a threshold control signal for switching off one switch of the first switch and the second switch when a current through the one switch exceeds a current threshold, wherein the threshold control circuit has an input for receiving a current signal indicating the current through the one switch, and a comparator for comparing the current signal with the current threshold to obtain the threshold control signal; and
   an on-time control circuit comprising a calculating unit for calculating an on-time duration for an other switch of the first switch and the second switch, the other switch not being the one switch, wherein the on-time duration is proportional to an average output current and inversely proportional to an output voltage, wherein the control circuit is adapted for adjusting a negative peak current and a positive peak current to obtain a substantially constant switching frequency of the synchronous converter during dimming of the load.

2. The synchronous converter as claimed in claim 1 further comprising a resistor or a transformer arranged for obtaining the current signal through the one switch.

3. The synchronous converter as claimed in claim 1, wherein the other switch is the second switch and wherein the on-time control circuit is arranged for controlling the second switch and for increasing the on-time of the second switch to lower a desired level of the output voltage.

4. The synchronous converter as claimed in claim 1, wherein the synchronous converter is arranged to be operated in a normal operation in only the first mode and the second mode.

5. The synchronous converter as claimed in claim 4, wherein the synchronous converter is configured in a buck configuration, wherein the first switch and the second switch are connected in series with the input terminals and the inductor is further connected to one of the output terminals.

6. The synchronous converter as claimed in claim 5, wherein the other switch is the second switch and the on-time control circuit is arranged to calculate the on-time duration during normal operation as:

$$T_{on} = \frac{L_1 \cdot 2 \cdot (I_{led} + I_{neg})}{V_{out}} - T_{delay}$$

wherein $T_{on}$ is the on-time duration of the second switch, $L_1$ is the inductance value of the inductor, $I_{led}$ is the average output current, $I_{neg}$ is the negative peak current through the inductor, $V_{out}$ is the output voltage and $T_{delay}$ is a delay caused by the second switch when switching off.

7. The synchronous converter as claimed in claim 4, wherein the synchronous converter is arranged in a boost configuration, wherein the first switch and the second switch are connected in series with the output terminals and the inductor is further connected to one of the input terminals.

8. The synchronous converter as claimed in claim 7, wherein the other switch is the second switch and the on-time control circuit is arranged to calculate the on-time duration during normal operation as:

$$T_{on} = \frac{L_1 \cdot 2 \cdot (I_{led} + I_{neg})}{V_{out} - V_{in}} - T_{delay}$$

wherein $T_{on}$ is the on-time duration of the second switch, $L_1$ is the inductance value of the inductor, $I_{led}$ is the average output current, $I_{neg}$ is the negative peak current through the inductor, $V_{out}$ is the output voltage, $V_{in}$ is the input voltage and $T_{delay}$ is a delay caused by the second switch when switching off.

9. The synchronous converter as claimed in claim 1, wherein the control circuit is constructed for operating the synchronous converter in a zero voltage switching mode.

10. The synchronous converter as claimed in claim 9, wherein adjustment of the negative peak current is calculated by:

$$I_{neg} = \frac{V_{in}}{Z_x} \cdot \sqrt{1 - 2 \cdot \frac{V_{out}}{V_{in}}}$$

wherein $I_{neg}$ is the negative peak current through the inductor, $V_{in}$ is the input voltage, $V_{out}$ is the output voltage and $Z_x$ is calculated by:

$$Z_x = \sqrt{\frac{L_1}{C_{hb}}}$$

wherein $L_1$ is the inductance of the inductor and $C_{hb}$ is an equivalent half bridge capacitance.

11. A synchronous converter as claimed in claim 1, wherein, in a non-normal operating state, the synchronous converter is further arranged to operate in a third mode, wherein in the third mode both the first switch and the second switch are in the off state.

12. A system comprising the synchronous converter as claimed in claim 1, wherein the synchronous converter further comprises the load, and wherein the load is connected to the output terminals.

13. A system as claimed in claim 12, wherein the load comprises an LED.

14. A method for controlling the synchronous converter as claimed in claim 1, wherein the method comprises the steps of:
   turning on the first switch for storing energy in the inductor;
   turning off the first switch upon reaching the threshold of energy stored in the inductor;
   turning on the second switch;
   calculating the duration of the on-time period for the second switch being proportional to the average output current and inversely proportional to the output voltage; and
   turning off the second switch at the end of the on-time period,
   wherein the negative peak current is chosen such that a switching frequency of the synchronous converter remains substantially constant.

15. A method for controlling a synchronous converter for driving a load, the method comprising:
   receiving, at input terminals, an input voltage from a power source;
   supplying, at output terminals, an output current and an output voltage to the load;
   operating the synchronous converter in a first mode and a second mode, the synchronous converter comprising a first switch coupled in series with a second switch via a node, and an inductor coupled to the node, wherein in the first mode the first switch is in an on state and the second switch is in an off state, and the first switch and the inductor form a series arrangement coupled between the input terminals, and wherein in the second mode the first switch is in an off state and the second switch is in an on state, and the second switch and the inductor form a series arrangement coupled between the output terminals;
   generating a threshold control signal for switching off one switch of the first switch and the second switch when a current through the one switch exceeds a current threshold, wherein generating the threshold control signal comprises receiving a current signal indicating the current through the one switch, and comparing the current signal with the current threshold to obtain the threshold control signal; and
   calculating an on-time duration for an other switch of the first switch and the second switch, the other switch not being the one switch, wherein the on-time duration is proportional to an average output current and inversely proportional to an output voltage; and
   adjusting a negative peak current and a positive peak current to obtain a substantially constant switching frequency of the synchronous converter during dimming of the load.

* * * * *